E. C. BASS.

FOCAL PLANE SHUTTER.

APPLICATION FILED JAN. 2, 1920.

Reissued Apr. 13, 1920. 14,837.

2 SHEETS—SHEET 1.

Witnesses:

L. C. Badeau

H. D. Penney

Inventor:

Ernest C. Bass,

By his Att'y, W. H. Richards.

E. C. BASS.

FOCAL PLANE SHUTTER.

APPLICATION FILED JAN. 2, 1920.

Reissued Apr. 13, 1920.

14,837.

2 SHEETS—SHEET 2.

Witnesses:
L. C. Badeau
H. D. Penney

Inventor:
Ernest C. Bass,
By his Att'y, F. H. Richard.

UNITED STATES PATENT OFFICE.

ERNEST C. BASS, OF NEW YORK, N. Y.

FOCAL-PLANE SHUTTER.

14,837. Specification of Reissued Letters Patent. Reissued Apr. 13, 1920.

Original No. 1,287,183, dated December 10, 1918, Serial No. 241,806, filed June 25, 1918. Application for reissue filed January 2, 1920. Serial No. 349,051.

*To all whom it may concern:*

Be it known that I, ERNEST C. BASS, a subject of the King of Great Britain, and a resident of the city of New York, borough of Manhattan, in the county and State of New York, have invented certain new and useful Improvements in Focal-Plane Shutters, of which the following is a specification.

The invention relates to photographic cameras, such, for instance, as shown and described in the application for Letters Patent of the United States, for a gun camera, Serial No. 231,491, filed by me on April 29th, 1918.

The object of the invention is to provide a new and improved focal plane shutter arranged to permit of accurately and positively making exposures in rapid succession.

Another object is to actuate the shutter from the film feeding mechanism to operate in unison with the latter.

A further object is to provide a focal plane shutter comprising a first or main shutter movable in one direction from normally open exposure position to exposure closing position, and movable in a direction reverse to the first direction to normally open exposure position; and a second or auxiliary shutter movable from normally closed exposure position to open exposure position when the first or main shutter is moved in the first mentioned direction, and movable to normally closed exposure position when the first or main shutter is moved in said reverse direction; the second or auxiliary shutter being retained for a time in open exposure position during the reverse movement of the first or main shutter.

A further object is to provide such a focal plane shutter, in which the speed of exposure movement of the second or auxiliary shutter, as related to the speed of exposure movement of the first or main shutter may be controlled.

A further object is to provide such a focal plane shutter, in which the speed of exposure movement of the second or auxiliary shutter, as related to the speed of exposure movement of the first or main shutter may be controlled, and is independent of the speed of exposure movement of the first or main shutter.

With these and other objects in view, the invention consists of certain novel features of construction as hereinafter shown and described, and then pointed out in the claims.

A practical embodiment of the invention is represented in the accompanying drawings forming a part of this specification, in which similar characters of reference indicate corresponding parts in all the views.

Figure 1:
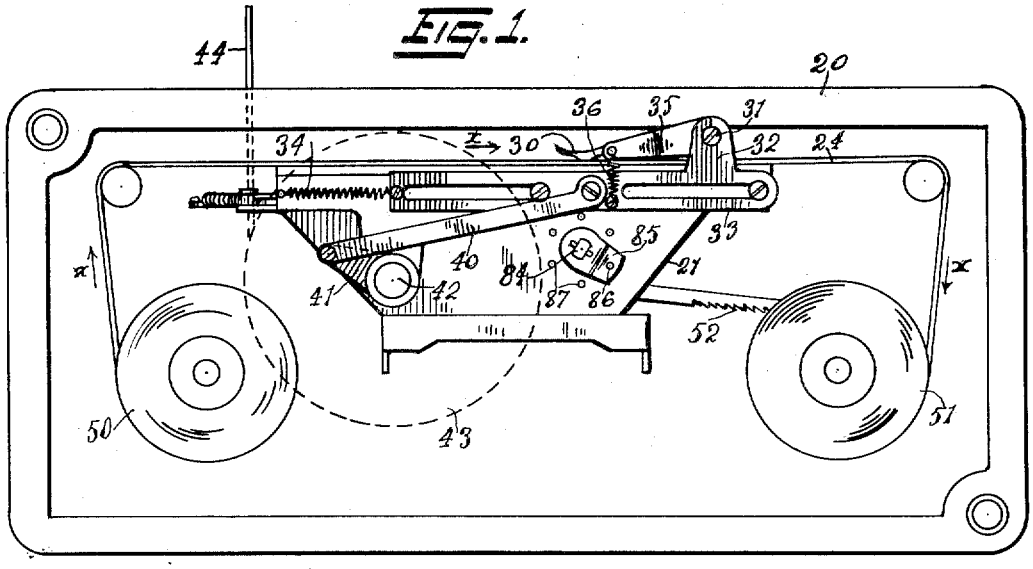
Figure 1 is an inverted plan view of the top of the film housing provided with the focal plane shutter.

The top 20 of the film housing (not shown) is provided at the under side with a depending support 21 provided at the rear with an exposure plate 22 having the usual exposure opening 23 for admitting light to the portion of the film 24 in register with the exposure opening 23 at the time. The film 24 is fed intermittently in the direction of the arrow $x$ by the use of feed arms 30 adapted to engage the usual apertures along the side margins of the film 24. The feed arms 30 are mounted on a vertically disposed shaft 31 journaled in suitable bearings 32 arranged at the sides 33 of a slide mounted to slide on suitable guide-ways on the support 21, as plainly indicated in the drawings. The sides 33 of the slide are pressed on by suitable springs 34 attached to the support 21 to normally hold the slide in its normal position to the left, as shown in Figs. 1, 2, 3 and 4. The shaft 31 carrying the feed arms 30 is provided with an arm 35 pressed on by a spring 36 connected with one of the sides 33 to properly engage the feed arms 30 with the apertures in the film 24.

The sides 33 of the slide are pivotally connected by pitmen 40 with crank arms 41 attached to a vertically disposed rock shaft 42 journaled in suitable bearings arranged on the support 21. The rock shaft 42 extends through the top 20 and is provided at its upper end with a drum 43 on which is fastened one end of a cord or similar flexible connection 44 connected with the mechanism for rotating the drum 43 with a view to feed the film 24 across the exposure opening 23 from the left to the right in the manner more fully described in the patent above refered to. It is understood that the film 24 unwinds from a spool 50 and winds up on a spool 51, both spools being mounted on the top 20 and the spool 51 being intermittently rotated by a suitable mechanism 52 connected with one of the pitmen 40.

Figure 3:
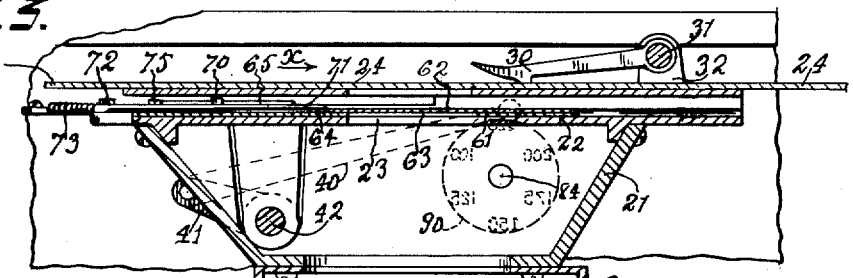
Fig. 3 is an inverted sectional plan view of the same on the line 3—3 of Fig. 2.
Figure 5:
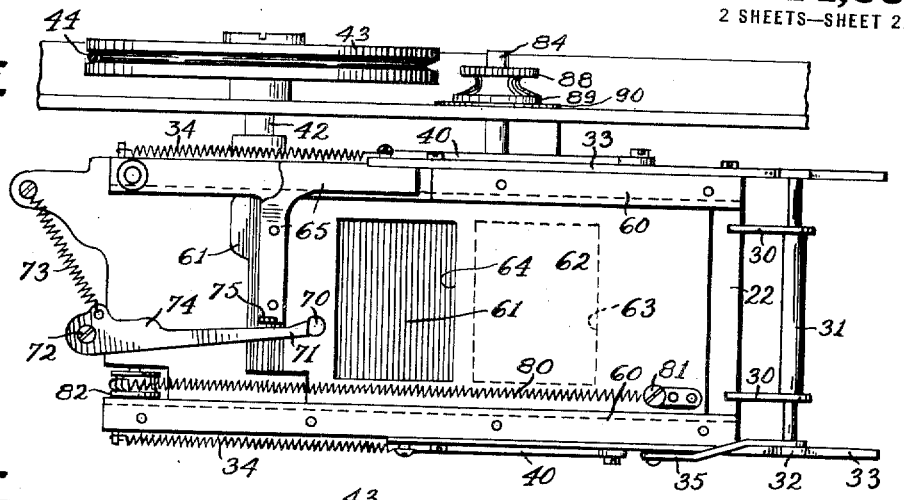
Fig. 5 is a rear elevation of the same with the shutter in forward closed position.
Figure 6:
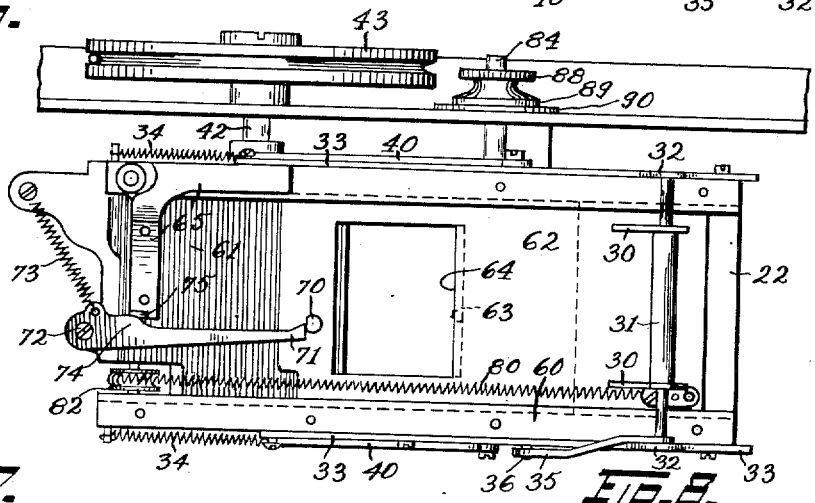
Fig. 6 is a similar view of the same with the shutter in open position.
Figure 7:
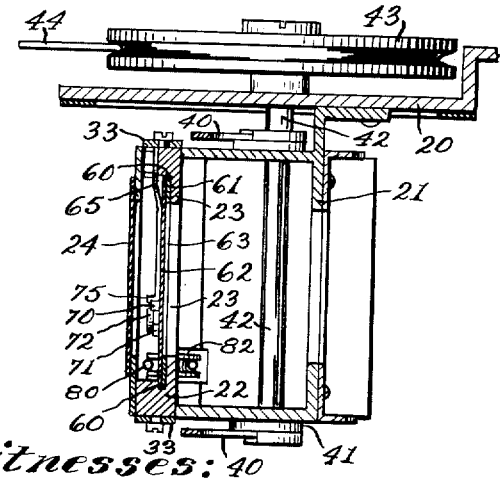
Fig. 7 is a sectional side elevation of the same on the line 7—7 of Fig. 2.

On the rear face of the exposure plate 22 are arranged guide-ways 60 in which are mounted to slide a main shutter 61 and an auxiliary shutter 62, of which the shutter 61 overlies the exposure plate 22 and the auxiliary shutter 62 overlies the main shutter 61 (see Fig. 3). The main shutter 61 is provided with an opening 63 normally in register with the exposure opening 23 at the time the shutters are in normal position of rest. The auxiliary shutter 62 is provided with an opening 64 normally out of register with the openings 63 and 23 but adapted to move into register with the exposure opening 23 at the time the main shutter 61 is moving back to the normal position of rest. The left-hand side of the main shutter 61 is attached to an arm 65 connected with or forming part of the top side 33 of the slide to cause the main shutter 61 to move with the slide when the latter is actuated from the rock shaft 42. The arm 65 is adapted to engage the left-hand end of the auxiliary shutter to move the latter from the left to the right during this movement of the main shutter 61, but when the latter returns to its position of rest the arm 65 moves out of engagement with the left-hand end of the auxiliary shutter 62 which latter is temporarily held in its active position to the right. For this purpose the following arrangement is made: On the left-hand end of the auxiliary shutter 62 is secured a stop 70 in the form of a lug adapted to be engaged by the free end of an arm 71 fulcrumed at 72 on the support 21 and pressed on by a spring 73 to hold the free end of the lever 71 in engagement with the stop 70, as indicated in Figs. 5 and 6. The lever 71 is provided with a cam 74 adapted to be engaged by a lug 75 preferably forming part of the arm 65 to swing the lever 71 out of engagement with the stop 70 at the time the main shutter 61 nears the end of its return stroke, that is, at the time the opening 63 of the main shutter 61 is in register with the exposure opening 23 and the opening 64 of the auxiliary shutter 62 is likewise in register. When the lever 71 is moved out of engagement with the stop 70 the auxiliary shutter 62 moves back to its position of rest, that is, from the right to the left, by the action of a spring 80 attached to one end at 81 to the right-hand side of the camera shutter 62.

Figure 2:
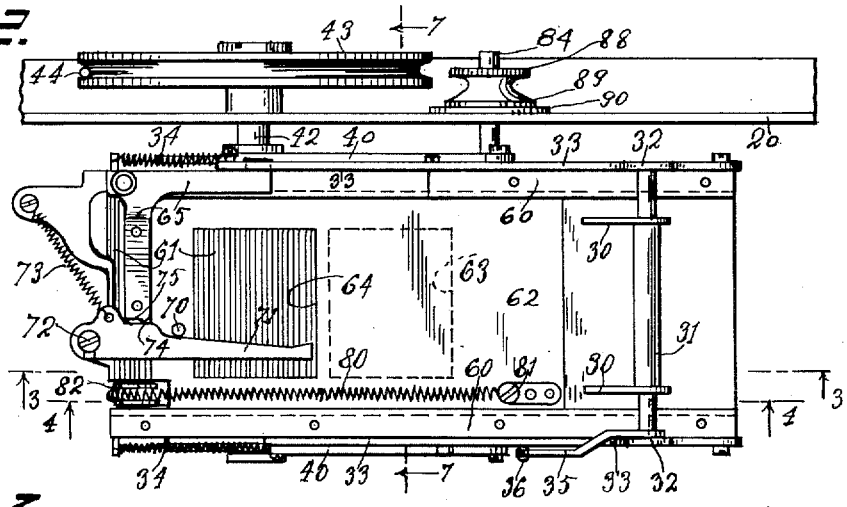
Fig. 2 is a rear elevation of the same with the focal plane shutter in normal closed position.
Figure 4:
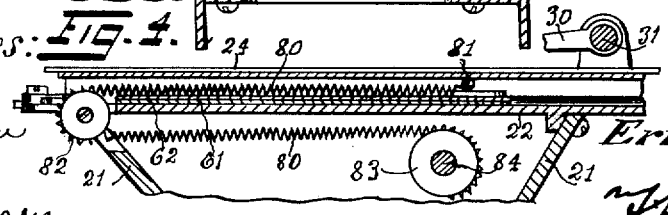
Fig. 4 is a similar view of the same on the line 4—4 of Fig. 2.

In order to increase or decrease the speed of the auxiliary shutter 62 the tension of the spring 80 is regulated, and for this purpose the spring 80 is in the form of a coil spring which passes over a guide pulley 82 journaled on the left-hand side of the support 21 (see Figs. 2 and 4). The spring 80 next passes from the guide pulley 82 to the right and winds on a drum 83 having a shaft 84 journaled in the bottom of the support 21. On the lower end of the shaft 84 (see Fig. 1) is secured a spring arm 85 provided with a lug 86 adapted to engage at the time one of a series of recesses 87 arranged in a circle on the under side of the bottom of the support 21. By the operator turning the arm 85 around more or less tension is given to the spring 80 by winding up the latter on the drum 83 or unwinding it therefrom according to the direction in which the arm 85 is turned at the time by the operator. When the spring 80 has been adjusted to the desired tension the arm 85 is locked in place by its lug 86 engaging a corresponding recess 87.

In order to permit of conveniently turning the shaft 84 and its arm 85 from the top of the camera, the upper end of the shaft 84 is provided with a handle 88 in the form of a knurled disk having a notch 89 indicating on a dial 90 fixed on the upper surface of the housing top 20. The dial is provided with a graduation indicating the speed of the shutter, thus enabling the operator to conveniently and quickly regulate the tension of the spring 80 to a desired shutter speed.

The operation is as follows:

When the film 24 is at rest, the main shutter 61 and the auxiliary shutter 62 are likewise at rest in their left-hand positions on the exposure plate 22. When the drum 43 is rotated and the film 24 is fed from the left to the right in the direction of the arrow $x$ then a like movement is given to both shutters 61 and 62 owing to the shutter 61 being connected with the top slide side 33 and the arm 65 attached to the main shutter 61 engaging the left-hand side of the camera shutter 62. During this movement from the left to the right of the main shutter 61 the opening 63 thereof moves out of register with the exposure opening 23, while the opening 64 of the auxiliary shutter 62 moves into register with the exposure opening 23, but the latter is closed by the main shutter 61 to prevent the rays of light from passing to the film 24. When the shutters 61 and 62 move from the left to the right then the lug 75 of the arm 65 moves out of engagement with the lever 71, and when the shutters are about to reach their right-hand end positions the lever 71 swings into stopping engagement with the stop 70 (see Fig. 5) thus holding the auxiliary shutter 62 temporarily locked in right-hand position by the said lever 71. When the drum 43 is released and ceases to rotate, the springs 34 cause a return movement of the slide and likewise of the shaft 42 and the drum 43 whereby the main shutter 61 is caused to return to its position of rest and in doing so its opening 63 moves into register with the exposure opening 23, and as the auxiliary shutter 62 is held in open position and its opening 64 is in register with the exposure opening 23 it is evident that the light can pass to the film 24, and an exposure is made. It is understood that the feed arms 30 during the return movement of the slide glide over the film and the latter is at rest during the time the exposure is made. When the main shutter 61 nears the end of its return stroke the lug 65 engages the cam 74 thus imparting a downward swinging movement to the lever 71, whereby the latter is moved out of engagement with the stop 70 and the auxiliary shutter 62 is moved back to its position of rest by the action of its spring 80.

From the foregoing it will be seen that by the arrangement described a quick shutter action is obtained to permit of accurately and positively making exposures in rapid succession. It will be noticed that the locking and releasing of the auxiliary shutter is controlled from the main shutter and the movement of the latter is governed by the film feeding mechanism so that the exposures are made at the proper time, that is, when the film is at rest.

Figure 8:
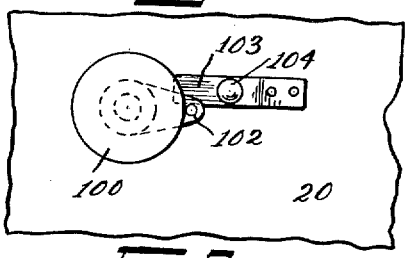
Fig. 8 is a face view of the shutter actuating mechanism when the shutter is applied to an ordinary film camera.
Figure 9:
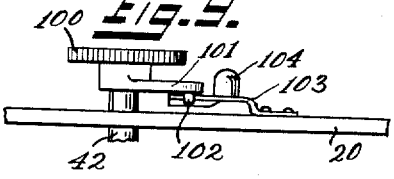
Fig. 9 is a plan view of the same.

I do not limit myself to the particular means employed for turning the rock shaft 42 as the latter may be turned by hand for feeding the film and for this purpose an arrangement is made such as shown, for instance, in Figs. 8 and 9. The upper end of the rock shaft 42 in this case is provided with a knob 100 under the control of the operator and provided with an arm 101 having a pin 102 adapted to abut against one side of a spring arm 103 attached to the upper surface of the top 20.

The spring arm 103 is provided with a knob 104 to permit of conveniently pressing the spring arm 103 out of engagement with the pin 102 to allow the rock shaft 42 to revolve by the action of the spring 34 connected with the slide 33. It is understood that when the knob 100 is turned the film is fed from the left to the right and the springs 34 are put under tension and when the spring arm 103 is pressed and the knob 104 is released then the shutter mechanism is returned to its normal position of rest and while the film is at rest, as above explained.

Having thus described my invention it should be understood that there may be modifications thereof and variations therein without departing from the spirit of my invention or exceeding the scope of the appended claims.

Having thus described my invention, I claim as new and desire to secure by Letters Patent:

1. In combination, intermittent film exposure means; a support having an exposure opening; a main shutter member adapted when in abnormal position to close said exposure opening; an auxiliary shutter member adapted when in abnormal position to open said exposure opening and when in normal position to close it; and intermittent actuating means for moving both shutters to abnormal position, and for first restoring the main shutter member to normal position and subsequently the auxiliary shutter member.

2. In combination, a fixed plate having an exposure opening; a main shutter movable from normal open position relative to said opening to closing position relative to said opening, and returnable to normal open position; and an auxiliary shutter movable from normal closing position relative to said opening to open position relative to said opening when said main shutter is moved to closing position; said auxiliary shutter being returnable to normal closing position relative to said opening when said main shutter is returned to normal open position relative thereto, and being retained for a time in open position while the main shutter is returning to normal open position.

3. In combination, a fixed plate having an exposure opening; a main shutter normally in open position relative to said opening; an auxiliary shutter normally in closing position relative to said opening; means for moving said main shutter from normal open position to closing position relative to said opening and moving said auxiliary shutter from normal closing position to open position relative to said opening; means for returning said main shutter to normal open position; means for returning said auxiliary shutter to normal closing position when the main shutter is returned to normal open position; and means for retaining said auxiliary shutter for a time in open position relative to said opening while said main shutter is returning to normal open position relative to said opening.

4. In combination, a fixed plate having an exposure opening; a main shutter normally in open position relative to said opening; an auxiliary shutter normally in closing position relative to said opening; means for moving said main shutter from normal open position to closing position relative to said opening and moving said auxiliary shutter from normal closing position to open position relative to said opening; means for returning said main shutter to normal open position; means for returning said auxiliary shutter to normal closing position when the main shutter is returned to normal open position; means for retaining said auxiliary shutter for a time in open position relative to said opening while said main shutter is returning to normal open position relative to said opening; and means for controlling the speed of return of said auxiliary shutter to normal closing position after release by said retaining means.

5. In a photographic apparatus having an exposure opening, in combination, a fixed plate having an exposure opening; a film intermittently fed past said exposure opening; a main shutter movable in the direction in which said film is fed, and moving from normal open position relative to said opening to closing position relative to said opening when so moved, and movable to normal open position when moved in direction reverse to the direction in which said film is fed; an auxiliary shutter movable from normal closing position relative to said opening to open position relative to said opening when the main shutter is moved in the direction in which the film is fed, and movable to normal closing position when the main shutter is moved in said reverse direction; means for moving said main and auxiliary shutters in the direction in which the film is fed; means for moving said main shutter in said reverse direction; and means for moving said auxiliary shutter in said reverse direction.

6. In combination, a fixed plate having an exposure opening; a film intermittently fed past said exposure opening; a main shutter movable in the direction in which said film is fed, and moving from normal open position relative to said opening to closing position relative to said opening when so moved, and movable to normal open position when moved in direction reverse to the direction in which said film is fed; an auxiliary shutter movable from normal closing position relative to said opening to open position relative to said opening when the main shutter is moved in the direction in which the film is fed, and movable to normal closing position when the main shutter is moved in said reverse direction; means for moving said main and auxiliary shutters in the direction in which the film is fed; means for moving said main shutter in said reverse direction; and means for moving said auxiliary shutter in said reverse direction; said auxiliary shutter being controllable as to the speed of exposure interval thereof relative to the speed of the exposure interval of the main shutter.

7. In combination, a fixed plate having an exposure opening; a film intermittently fed past said exposure opening, a main shutter movable in the direction in which said film is fed, and moving from normal open position relative to said opening to closing position relative to said opening when so moved, and movable to normal open position when moved in direction reverse to the direction in which said film is fed; an auxiliary shutter movable from normal closing position when the main shutter is moved in said reverse direction; means for moving said main and auxiliary shutters in the direction in which the film is fed; means for moving said main shutter in said reverse direction; and means for moving said auxiliary shutter in said reverse direction; said auxiliary shutter being retained for a time in open position relative to said opening while the main shutter is moving in said reverse direction.

8. In combination, a fixed plate having an exposure opening; a film intermittently fed past said exposure opening; a main shutter movable in the direction in which said film is fed, and moving from normal open position relative to said opening to closing position relative to said opening when so moved, and movable to normal open position when moved in direction reverse to the direction in which said film is fed; an auxiliary shutter movable from normal closing position relative to said opening to open position relative to said opening when the main shutter is moved in the direction in which said film is fed, and movable to normal closing position when the main shutter is moved in said reverse direction; means for moving said main and auxiliary shutters in the direction in which the film is fed; means for moving said main shutter in said reverse direction; and means for moving said auxiliary shutter in said reverse direction; said auxiliary shutter being retained for a time in open position relative to said opening while the main shutter is moving in said reverse direction, and being controllable as to the speed of the exposure interval thereof relative to the speed of the exposure interval of the main shutter.

9. In a photographic apparatus having an exposure opening, in combination, a photographic film; mechanism for intermittently feeding said film past said opening; a main shutter supported and arranged for movement by said mechanism in the direction in which said film is fed, said main shutter being thereby moved from normal open position relative to said opening to closing position relative to said opening; means for moving said main shutter to normal open position in direction reverse to the direction in which said film is fed; an auxiliary shutter supported and arranged to be moved with said main shutter from normal closing position relative to said opening to open position relative to said opening when said main shutter is moved in the direction in which said film is fed; and means for moving said auxiliary shutter to normal closing position when said main shutter is moved in the direction reverse to the direction in which said film is fed.

10. In a photographic apparatus having an exposure opening, in combination, a photographic film; mechanism for intermittently feeding said film past said opening; a main shutter supported and arranged for movement by said mechanism in the direction in which said film is fed, said main shutter being thereby moved from normal open position relative to said opening to closing position relative to said opening; means for moving said main shutter in direction reverse to the direction in which said film is fed to return the main shutter to normal open position; an auxiliary shutter supported and arranged for movement with said main shutter from normal closing position relative to said opening to open position relative to said opening when said main shutter is moved in the direction in which said film is fed; means for moving said auxiliary shutter to normal closing position when said main shutter is moved in direction reverse to the direction in which said film is fed; and means for retaining said auxiliary shutter for a time in open position relative to said opening while the main shutter is moving in said reverse direction.

11. In a photographic apparatus having an exposure opening, in combination, a photographic film; mechanism for intermittently feeding said film past said opening; a main shutter supported and arranged for movement by said mechanism in the direction in which said film is fed, said main shutter being thereby moved from normal open position relative to said opening to closing position relative to said opening; means for moving said main shutter in direction reverse to the direction in which said film is fed to return the main shutter to normal open position; an auxiliary shutter supported and arranged for movement with said main shutter from normal closing position relative to said opening to open position relative to said opening when said main shutter is moved in the direction in which said film is fed; means for moving said auxiliary shutter to normal closing position when said main shutter is moved in direction reverse to the direction in which said film is fed; means for retaining said auxiliary shutter for a time in open position relative to said opening while the main shutter is moving in said reverse direction; and means for controlling the speed of said auxiliary shutter in moving to said normal closing position after release by said retaining means.

12. In a camera, in combination, a fixed plate provided with an exposure opening, a photographic film, mechanism for feeding said film past said opening, a main shutter supported and arranged for movement by said mechanism in the direction in which said film is fed, said main shutter being thereby moved from normal open position relative to said opening to closed position relative to said opening, springs operatively connected to said main shutter for moving the main shutter in direction reverse to the direction in which said film is fed to return the main shutter to normal open position; an auxiliary shutter supported and arranged for movement with said main shutter from normal closing position relative to said opening to open position relative to said opening when said main shutter is moved in the direction in which said film is fed; a spring operatively connected to said auxiliary shutter for moving the auxiliary shutter to normal closing position when said main shutter is moved in said reverse direction; means for regulating the tension of said spring; and means for retaining said auxiliary shutter for a time in open position while the main shutter is moving in direction reverse to the direction in which said film is fed.

13. In a camera, in combination, a fixed plate provided with an exposure opening; a photographic film; mechanism for intermittently feeding said film past said opening, a main shutter supported and arranged for movement by said mechanism in the direction in which said film is fed, said main shutter being thereby moved from normal open position relative to said opening to closed position relative to said opening; springs operatively connected to said main shutter for moving the main shutter in direction reverse to the direction in which said film is fed to return the main shutter to normal open position; an auxiliary shutter supported and arranged for movement with said main shutter from normal closing position relative to said opening to open position relative to said opening when said main shutter is moved in the direction in which said film is fed; a spring operatively connected to said auxiliary shutter for moving the auxiliary shutter to normal closing position when said main shutter is moved in said reverse direction; and means controlled by said main shutter for retaining said auxiliary shutter for a time in open position while the main shutter is moving in direction reverse to the direction in which said film is fed.

14. In a camera, a fixed plate having an exposure opening, a photographic film, mechanism for intermittently moving said film past said opening, a main shutter independent of said mechanism but moved thereby in one direction and mounted to reciprocate on the said plate and adapted to open and close the said exposure opening, a movable auxiliary or cut off shutter bodily moving with the said main shutter into active position, and locking and releasing means controlled by the said main shutter on the return thereof thereby to temporarily hold the auxiliary shutter open and to subsequently release the auxiliary shutter for the latter to move into closed position.

15. In a camera, a fixed plate having an exposure opening, a reciprocating film feeding mechanism adapted to feed a film intermittently past the said exposure opening, a main shutter moving with the said film feeding mechanism, normally open relative to the said exposure opening and adapted to close the exposure opening during the forward feeding movement of the film feeding mechanism, an auxiliary shutter normally closing the exposure opening and adapted to move with the said main shutter into open position relative to the exposure opening during the forward feeding movement of the film feeding mechanism, and locking and releasing means controlled by the said main shutter to hold the auxiliary shutter temporarily in open position during the return movement of the main shutter and to release the auxiliary shutter and allow the latter to return at the time the main shutter nears the end of its return movement.

16. In a camera, a fixed plate having an exposure opening, a reciprocating film feeding mechanism adapted to feed a film intermittently past the said exposure opening, a main shutter moving with the said film feeding mechanism, normally open to the said exposure opening and adapted to close the exposure opening during the forward feeding movement of the film feeding mechanism, an auxiliary shutter normally closing the exposure opening and adapted to move with the said main shutter into open position relative to the exposure opening during the forward feeding movement of the film feeding mechanism, a stop on the said auxiliary shutter, a spring pressed lever fulcrumed on a fixed part of the camera and adapted to engage the said stop to hold the auxiliary shutter against return movement during the return movement of the main shutter, the lever having a cam face, and a tripping member moving with the main shutter and adapted to engage the said cam at the time the main shutter nears the end of its return movement to move the lever out of engagement with the said stop to allow the auxiliary shutter to return.

17. In a camera, a fixed plate having an exposure opening, a reciprocating spring actuated main shutter adapted to close and open the said exposure opening, an auxiliary shutter adapted to move in and out of register with the said exposure opening, a spring pressing the said auxiliary shutter to move the latter shut, a stop on the said auxiliary shutter, an arm on the said main shutter and adapted to engage the said auxiliary shutter to move the latter into open position on moving the main shutter into closed position, and a lever fulcrumed on a fixed part of the camera and adapted to engage the said stop, the said lever having a cam adapted to be engaged by the said arm at the time the main shutter nears the end of its return movement.

18. In a camera, a fixed plate having an exposure opening, a reciprocating spring actuated main shutter adapted to close and open the said exposure opening, an auxiliary shutter adapted to move in and out of register with the said exposure opening, a spring pressing the said auxiliary shutter to move the latter shut and manually controlled means connected with the said spring to regulate the tension thereof, a stop on the said auxiliary shutter, an arm on the said main shutter and adapted to engage the said auxiliary shutter to move the latter into open position on moving the main shutter into closed position, and a lever fulcrumed on a fixed part of the camera and adapted to engage the said stop, the said lever having a cam adapted to be engaged by the said arm at the time the main shutter nears the end of its return movement.

19. In a camera, a plate having an exposure opening, a spring pressed slide mounted to reciprocate on the said plate, a rock shaft provided with crank arms connected with the said slide to reciprocate the latter, feed arms mounted on the said slide and adapted to engage a film to intermittently feed the latter past the said exposure opening, a main shutter slidable on the exposure plate and moving with the said slide to alternately close and open the exposure opening, an auxiliary shutter, an arm on the said main shutter adapted to engage one end of the auxiliary shutter to move the latter into open position at the time the main shutter moves into closed position, a spring pressing the auxiliary shutter to move the latter from open into closed position, a stop on the auxiliary shutter, and a spring-pressed lever fulcrumed on a fixed part of the camera and adapted to engage the said stop, the said lever having a cam adapted to be engaged by the said arm at the time the main shutter nears the end of its return movement.

ERNEST C. BASS.

Witnesses:
E. H. WAKEFIELD,
D. L. SHOEMAKER.